US012712289B2

(12) United States Patent
Gok et al.

(10) Patent No.: US 12,712,289 B2
(45) Date of Patent: Aug. 18, 2026

(54) TWO-DIMENSIONAL FOLDABLE META-LENS ARRAY

(71) Applicant: Rockwell Collins, Inc., Cedar Rapids, IA (US)

(72) Inventors: Gurkan Gok, Milford, CT (US); Jason Milne, El Segundo, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 76 days.

(21) Appl. No.: 18/970,252

(22) Filed: Dec. 5, 2024

(65) Prior Publication Data

US 2026/0163254 A1 Jun. 11, 2026

(51) Int. Cl.
*H01Q 25/00* (2006.01)
*H01Q 21/06* (2006.01)

(52) U.S. Cl.
CPC ........... *H01Q 25/008* (2013.01); *H01Q 21/06* (2013.01)

(58) Field of Classification Search
CPC .. H01Q 3/26; H01Q 3/28; H01Q 3/36; H01Q 3/44; H01Q 5/42; H01Q 9/04; H01Q 13/20; H01Q 15/00; H01Q 15/02; H01Q 21/00; H01Q 21/06; H01Q 25/008
See application file for complete search history.

(56) References Cited

U.S. PATENT DOCUMENTS 3,979,754 A 9/1976 Archer
7,940,228 B1 5/2011 Buckley et al.
8,259,032 B1 9/2012 Buckley
9,748,663 B2 8/2017 Wong
10,283,876 B1 5/2019 Livadaru et al.
11,444,387 B2 9/2022 Achour et al.
11,450,953 B2 9/2022 Pelletti et al.
11,936,111 B2 3/2024 Emanuelsson et al.
2015/0214615 A1* 7/2015 Patel ...................... H01Q 3/443 342/372
2021/0391903 A1* 12/2021 Jam .......................... H01Q 3/24

FOREIGN PATENT DOCUMENTS

CN 113454848 A * 9/2021 ............... H01Q 9/28
EP 3300172 A1 * 3/2018 ......... H01Q 15/0066
GB 2624105 A * 5/2024 ............. H01Q 13/20
WO 2024069148 A1 4/2024

* cited by examiner

*Primary Examiner* — Hoang V Nguyen

(74) *Attorney, Agent, or Firm* — Millen, White, Zelano & Branigan P.C.; William F. Nixon

(57) ABSTRACT

A radio frequency (RF) beamformer includes a plurality of feed ports to receive input signals. The beamformer includes strips of unit cells having meta-lens material connected to the feed ports. Each feed port forms a signal within a group of unit cells of the strips. The beamformer includes a radiator array configured to transmit the signal within the respective group of unit cells. The beamformer includes at least one folding connection point located between a first strip of unit cells and a second strip of unit cells of the meta-lens material. The first strip of unit cells and the second strip of unit cells collapse on each other to stack the strips in the beamformer. The connection points move the signal between the strips of unit cells.

20 Claims, 6 Drawing Sheets

TWO-DIMENSIONAL FOLDABLE META-LENS ARRAY

FIELD OF THE INVENTION

The subject matter disclosed herein relates to passive beamformers having a meta-lens array. In particular, the subject matter disclosed herein relates to a beamformer that is designed with multiple layers to enhance its compactness.

BACKGROUND OF THE INVENTION

Microwave passive lenses/beamformers such as Rotman lenses, Butler matrices, and advanced metamaterial beamformers, have been used as antenna feed networks in lens-based switch-beam or multi-beam antenna arrays in defense and commercial systems. An issue with lens-based antenna arrays is the thickness, or the length between the microwave input source and the antennas or radiating aperture. This thickness is at least twice the size of the antenna aperture and allows for the reshaping of the microwave source's phase and amplitude profile to a commonly uniform or desired field profile at the antenna end. Lens-based antenna arrays with high directivity, such as a large aperture and narrow beam, may be limited for practical applications having low size, weight, and power-cost (SWAP) constraints.

Recently, metamaterial beamformers have been shown to have smaller thickness than the aperture size due to their unit cell-based construction. Despite the size improvement offered by metamaterials, it may be appreciated that such antenna arrays should still reduce their thickness in order to address SWAP issues within an aircraft or another similar platform.

SUMMARY OF THE INVENTION

The present disclosure is directed, in a first aspect, to a radio frequency (RF) beamformer. The RF beamformer includes a plurality of feed ports. The RF beamformer also includes a plurality of strips of unit cells comprising meta-lens material connected to the plurality of feed ports. Each feed port of the plurality of feed ports emits a signal within a group of unit cells within the plurality of strips. The RF beamformer also includes a radiator array configured to transmit at least one signal formed in the respective group of unit cells. The RF beamformer also includes at least one folding connection point located between the first strip of unit cells and a second strip of unit cells of the plurality of strips of unit cells. The first strip of unit cells and the second strip of unit cells collapse together at the at least one folding connection to form a stack of strips of unit cells. The first strip of unit cells and the second strip of unit cells are configured to propagate the at least one signal while in the stack.

In yet another embodiment, the present disclosure is directed to a two-dimensional (2D) radio frequency (RF) beamformer. The 2D RF beamformer includes a plurality of feed ports. The 2D RF beamformer also includes a group of horizontal strips of unit cells comprising meta-lens material connected to the plurality of feed ports. Each feed port of the plurality of feed ports inputs a signal within a first set of unit cells within one of the horizontal strips. The 2D RF beamformer also includes at least one horizontal folding connection point located between a first horizontal strip of unit cells and a second horizontal strip of unit cells of each of the group of horizontal strips of unit cells. The first horizontal strip of unit cells and the second horizontal strip of unit cells collapse together using the at least one horizontal folding connection point to form a stack of unit cells along a horizontal axis. The 2D RF beamformer also includes a group of vertical strips of unit cells comprising the meta-lens material connected to the group of horizontal strips of unit cells. The group of vertical strips further form the signal within a second set of unit cells within one of the vertical strips. The 2D RF beamformer also includes at least one vertical folding connection point located between a first vertical strip of unit cells and a second vertical strip of unit cells of each of the group of vertical strips of unit cells. The first vertical strip of unit cells and the second vertical strip of unit cells collapse together using the at least one vertical folding connection point to form a stack of unit cells along a vertical axis. The 2D RF beamformer also includes a radiator array configured to transmit the signal formed by the first set of unit cells in a horizontal direction and formed by the second set of unit cells in a vertical direction.

In yet another embodiment, the present disclosure is directed to a method for propagating a signal through a radio frequency beamformer. The method includes inputting the signal using a feed port of a plurality of feed ports connected to a meta-lens material array. The meta-lens material array is stacked in a plurality of layers. The method also includes propagating the signal between the plurality of layers of the meta-lens material array using at least one folding connection point between connected layers of the plurality of layers. The method also include applying a delay to the signal using at least one unit cell within each layer of the plurality of layers. The method also includes transmitting the signal based on the delay from a radiator array connected to the meta-lens material array.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1A:
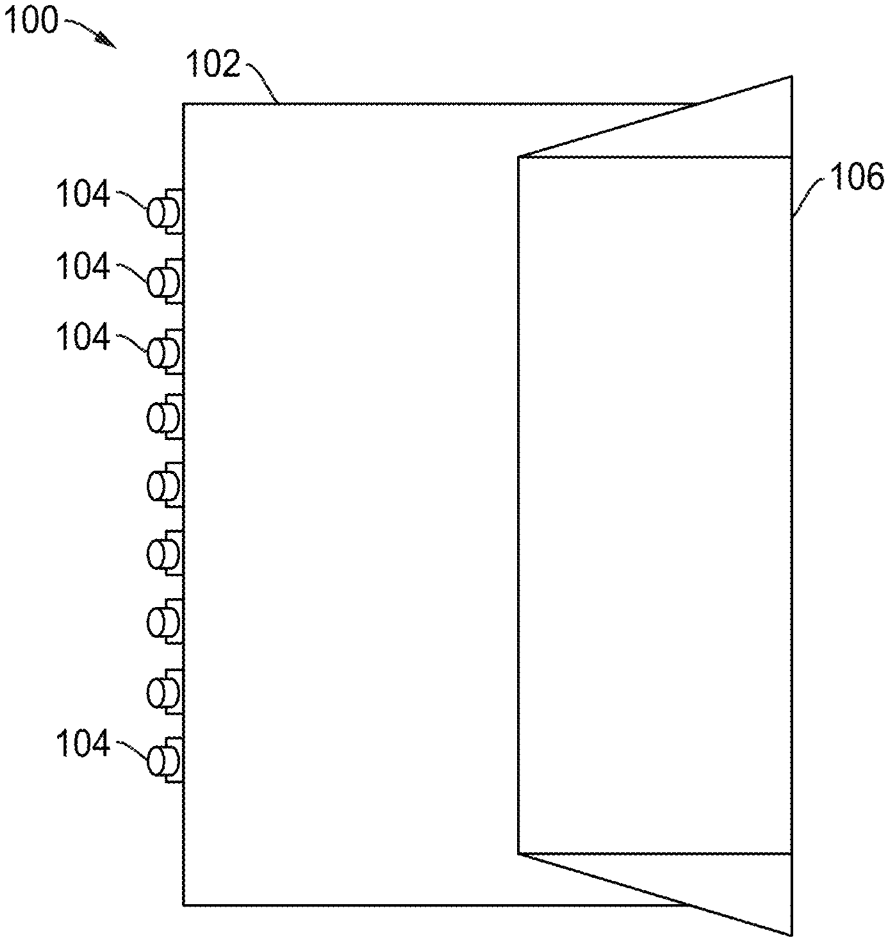
FIG. 1A illustrates a top view of a flat radio frequency (RF) beamformer antenna array according to the disclosed embodiments.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

Before explaining at least one embodiment of the inventive concepts disclosed herein in detail, it is to be understood that the inventive concepts are not limited in their application to the details of construction and the arrangement of the components, steps, methodologies, or frequency of operation set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

As used herein, a letter following a reference numeral is intended to reference an embodiment of the feature or element that may be similar, but not necessarily identical, to a previously described element or feature bearing the same reference numeral, such as 1, 1*a*, or 1*b*. Such shorthand notations are used for purposes of convenience only, and should not be construed to limit the inventive concepts disclosed herein in any way unless expressly stated to the contrary.

Moreover, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes plural unless it is obvious that it is meant otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

As used herein, any reference to "one embodiment," "alternative embodiments," or "some embodiments" means that particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features that may not necessarily be expressly described or inherently present in the instant disclosure.

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The present disclosure is directed to a beamformer antenna array that collapses the elements of metamaterial lenses into a low profile printed circuit board (PCB) layer stack by folding the microstrip material circuit into a compact multilayer stripline circuit to enable highly compact, low SWAP-C antenna arrays. The disclosed embodiments enable the feature to achieve minimum thickness in practice for a passive beamformer (microwave lens) feeding a 2D array of discrete radiators, which are spaced at half-wavelength at the lowest operation frequency of operation bandwidth. The disclosed embodiments also are applicable to optical passive beamformers in addition to microwave beamformers.

A planar microstrip-fed meta-lens array with feed points into a meta-lens circuit structure enables one-dimensional (1D) passive beam steering of a line array of radio frequency (RF) elements. The metamaterial beamformers functioning as lens may be referred to as meta-lens arrays. A line array may be fed from nine coaxial connectors across a microstrip beamformer board and may output to a flared notch radiator. The disclosed embodiments may collapse into a low profile printed circuit board (PCB) layer stack by folding the microstrip metamaterial circuit into a compact multilayer stripline circuit. The RF signal transition between layers may be achieved via a variety of structures including with vertical metalized vias, coupling structures as slots, or embedded corner reflectors. The nine elements in a strip may be placed next to many additional similar strips forming a larger two-dimensional (2D) scanning array in a single PCB.

Beam steering in a second dimension may be accomplished with phase shifters or potentially a similar phase shift meta-lens circuit stacked according to the disclosed embodiments.

The disclosed embodiments may offer a sizable reduction in SWAP footprint for the disclosed beamformer arrays. These arrays may enable low-cost directional RF aperture implementations for various platforms including vehicles, unmanned aerial vehicles (UAV), sat-com terminals, and the like.

Figure 1B:
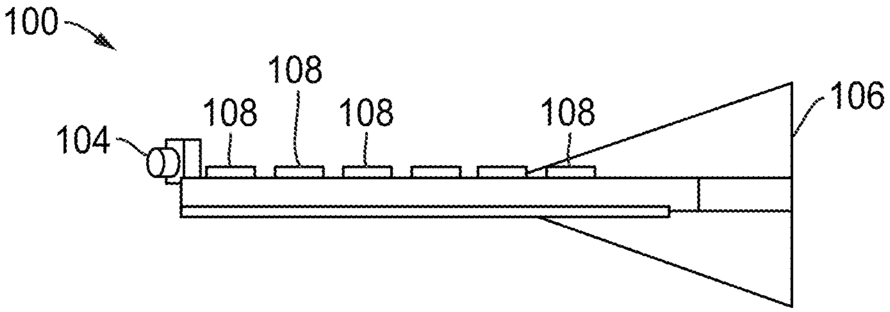
FIG. 1B illustrates a side view of the RF beamformer antenna array according to the disclosed embodiments.

FIG. 1A depicts a top view of a radio frequency (RF) beamformer 100 according to the disclosed embodiments. FIG. 1B illustrates a side view of the RF beamformer 100 according to the disclosed embodiments. Beamforming may be approaches to provide apertures with directional functionality in transmit and receive mode. In some embodiments, beamformer 100 is a passive beamformer. Microwave passive beamformers are used to feed radiating arrays. They may allow multiple antenna beams to be formed without the need for switches or phase shifters. The phased arrays of beamformers enable an entire set of contiguous beams to be formed simultaneously, with each beam processing the full gain of the projected array aperture. In this type of phased array, true time delay may be used in the beam formation, so the beam-pointing directions in space remain invariant with frequency, or free of beam-squint.

Beamformer 100 may be a meta-lens array 102 having a plurality of feed ports 104. Meta-lens array 102 is comprised of a plurality of unit cells 108 arranged in strips. The unit cells are comprised of meta-lens material. Feed ports 104 may be coaxial connectors across the board for meta-lens array 102. The number of feed ports 104 may vary according to the disclosed embodiments. For example, the number of feed ports 104 shown in FIGS. 1A and 1B is nine.

In some embodiments, beamformer 100 is comprised of numerous unit cells arranged across a surface or throughout a volume. When a port is activated, an electromagnetic wave is emitted within the beamformer structure. Each unit cell may interact with the generated electromagnetic waves, within the extent of the interaction varying based on the location of the feed port. This feature may be disclosed in greater detail below.

Signals fed into meta-lens array 102 from feed ports 104 are output to flared notch radiator 106. Each feed port 104 forms a signal within a group of unit cells within the plurality of unit cells 108 that is output by radiator 106. Radiator 106 may include a radiator array having transmitting elements. Meta-lens array 102 may be used to form an output beam for transmission by radiator 106 based on applying time delays (or phase shifts) to a signal from one of feed ports 104 using units 108. The time delays may be applied in accordance with a desired direction for the transmission wherein radiator 106 is configured to simultaneously transmit multiple output beams by summing time delayed signals from multiple feed ports 104.

For example, signals entering meta-lens array 102 may travel varying distances within the array to reach radiator 106. Thus, beamformer 100 may implement a time-delay beamforming lens. Alternatively, beamformers 100 may implement a phase-shift beam forming lens that adjust the phase of signals within meta-lens array 102. Strips of unit cells 108 may be used within meta-lens array 102 to provide these delays and shifts.

Figure 2:
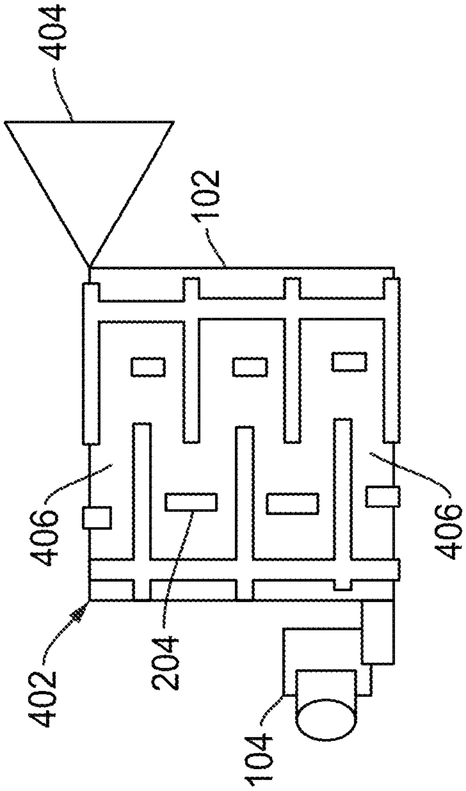
FIG. 2 illustrates a side view of a foldable beamformer having folded strips of unit cells according to the disclosed embodiments.
Figure 3:
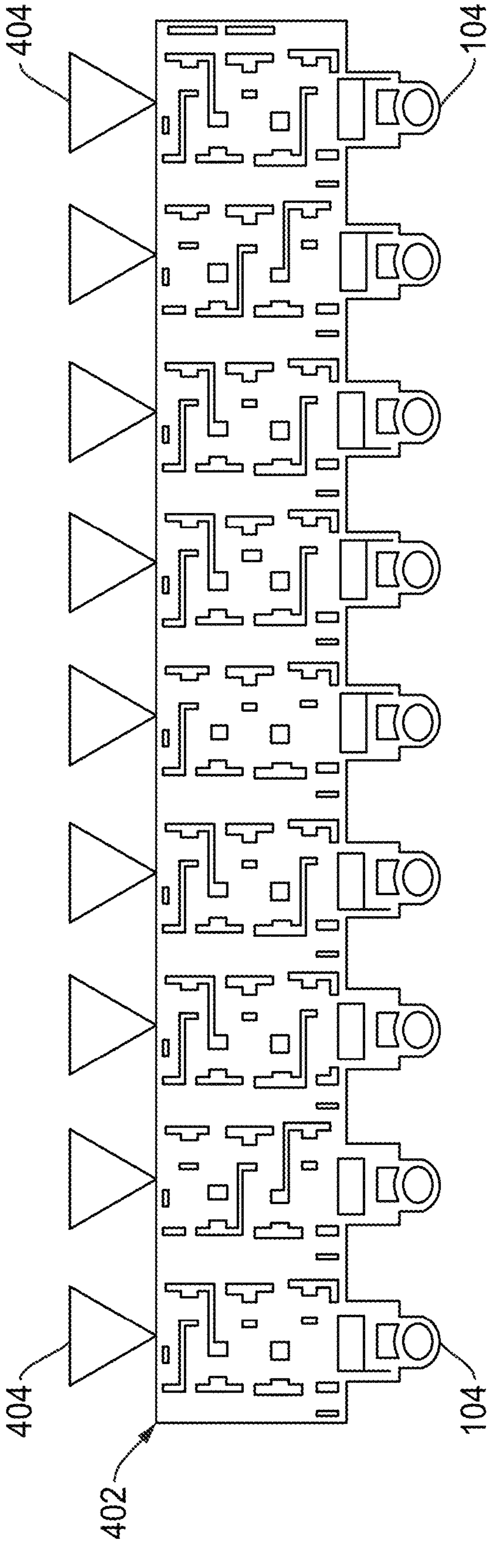
FIG. 3 illustrates a top view of the foldable beamformer according to the disclosed embodiments.

FIG. 2 depicts a side view of a folder beamformer 400 having folded strips 402 of unit cells 108 according to the disclosed embodiments. FIG. 3 depicts a top view of folded beamformer 400 according to the disclosed embodiments. The metamaterial based beamformer may be folded for compactness. Beamformer 100 may be folded on itself multiple times to reduce the thickness, or distance between feed ports 104 and transmitting elements 404 of radiator 106, to as small as one unit cell 108 thickness for linear arrays.

The disclosed embodiments collapse the elements into a low profile printed circuit board (PCB) layer stack by folding the strips of metamaterial circuits into a compact multilayer stripline circuit as shown in FIG. 2. The strips are folded using connection points between the strips, or layers, of the folded beamformer. The RF signal transition between layers maybe achieved via numerous structures including vertical metalized vias, coupling structures such as slots, or embedded corner reflectors. Stripline transmission lines may be selected over microstrip transmission lines for layered implementation and isolation between layers.

For example, meta-lens array 102 may be four inches long from input to output for a planar printed circuit board. Folded beamformer 402 may have meta-lens array dimensions of 0.5 inches long and 0.5 inches tall. These dimensions reduce the size requirements for deploying a beamformer while still preserving the length or width needed to propagate signals at specified wavelengths. The disclosed embodiments may provide a subwavelength thick beamformer. The act of folding a beamformer multiple times may achieve a beamformer with subwavelength thickness. The length of the beamformer is independent of the aperture size. This feature breaks the relationship between length and bandwidth. Use of the metamaterial allows for these features. The metamaterial allows for unit cell-based design, which enables folding at each unit cell 108 that result in thin beamformers.

Folded beamformer 402 includes feed ports 104. A signal may be provided to one or more feed ports 402 that goes through meta-lens array 102 to be transmitted by transmitting elements 404. In some embodiments, the number of transmitting elements 404 are equal to the number of feed ports 104. Each feed port 104 may transmit the received signal after going through array 102 from a corresponding transmitting element 404. The signals flow through meta-lens array 102 that includes metamaterial radiating elements 204 in unit cells 108 that are collapsed on each other to form folded beamformer 402.

The signals still route through the appropriate unit cells of meta-lens array 102 so that the delays or phase shifts occur to the signals just as with beamformer 102, which represents the non-folded configuration. Folded beamformer 402 may have slots 406 that allow the signals to move between unit cells 108 while stacked. The strips of unit cells 108 may be folded on top of each other and the thickness of folded beamformer 402 may be based on the size of a strip of unit cells.

Figure 4:
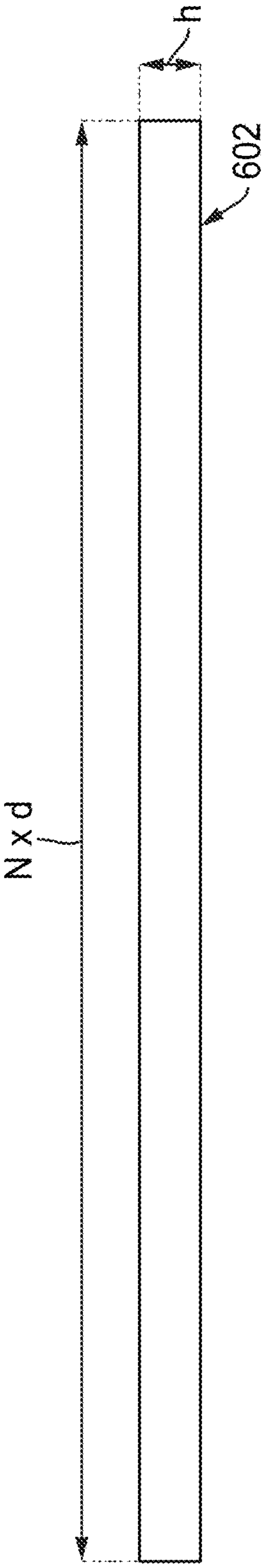
FIG. 4 illustrates a side view of a flat meta-lens array according to the disclosed embodiments.
Figure 5:
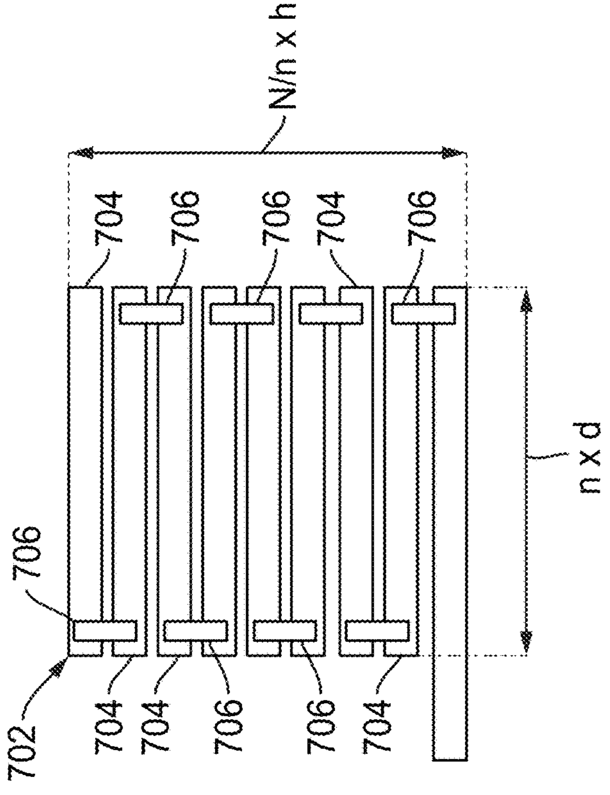
FIG. 5 depicts a side view of a foldable meta-lens array according to the disclosed embodiments.

FIG. 4 depicts a side view of a flat meta-lens array 602 according to the disclosed embodiments. FIG. 5 depicts a side view of a folded meta-lens array 702 according to the disclosed embodiments. Flat meta-lens array 602 may correspond to meta-lens array 102 disclosed above. Flat meta-lens array 602 may have the following dimensions: d (unit cell 108 dimension), N (the number of unit cells 108 over the width of beamformer 602, h (substrate height), and n (the number of unit cells per layer for folded beamformer 702.

The disclosed array may be used in an X-band beamformer. Example dimensions may be h=0.75 mm, N=20, d=3 mm, and n=2. Thus, the width, or thickness of flat meta-lens array 602 may be N×d, or 60 mm while the height is h, or 0.75 mm. The disclosed embodiments may fold the strips of unit cells 108 into layers 704 used within folded meta-lens array 702. The width, or thickness, of folded meta-lens array 702 may be n×d, or 6 mm, which is longer than a single unit cell 108. The height may be N/n×h, or 20/2×0.75 mm, or 7.5 mm. Flat meta-lens array 602 may have dimensions of 60 mm×0.75 mm while folded meta-lens array 702 may have dimensions of 6 mm×7.5 mm. Folded meta-lens array 702, therefore, may be used in spaces having a reduced width or thickness. Further, the number of unit cells 108 within a layer 704 may be adjusted to vary the height of the folded meta-lens array.

Folded meta-lens array 702 may be configured to receive signals through feed ports 104, propagate the signal through layers 704, and transmit the propagated signals from transmitting elements 404, as disclosed above. Folded meta-lens array 702 is configured to perform like the folded array in folded beamformer 402, disclosed above. Signals may move between layers using vias 706. In some embodiments, vias 706 are metallized vias. Vias 706 may be metal pins configured to pass signals from one layer to another within folded meta-lens array 702. This feature may allow layers 704 to be folded on top of each other.

Figure 6:
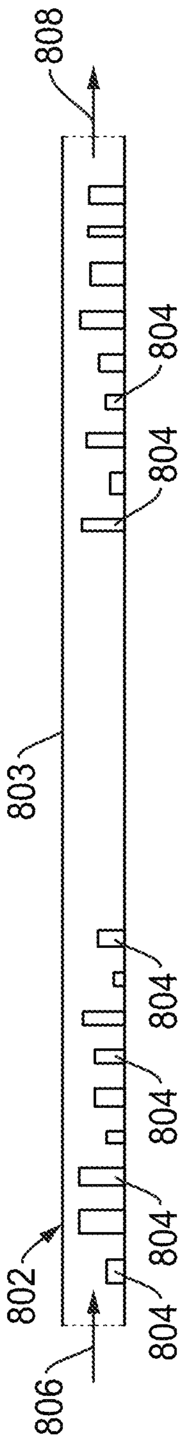
FIG. 6 illustrates side view of a flat metallic meta-lens array according to the disclosed embodiments.
Figure 7:
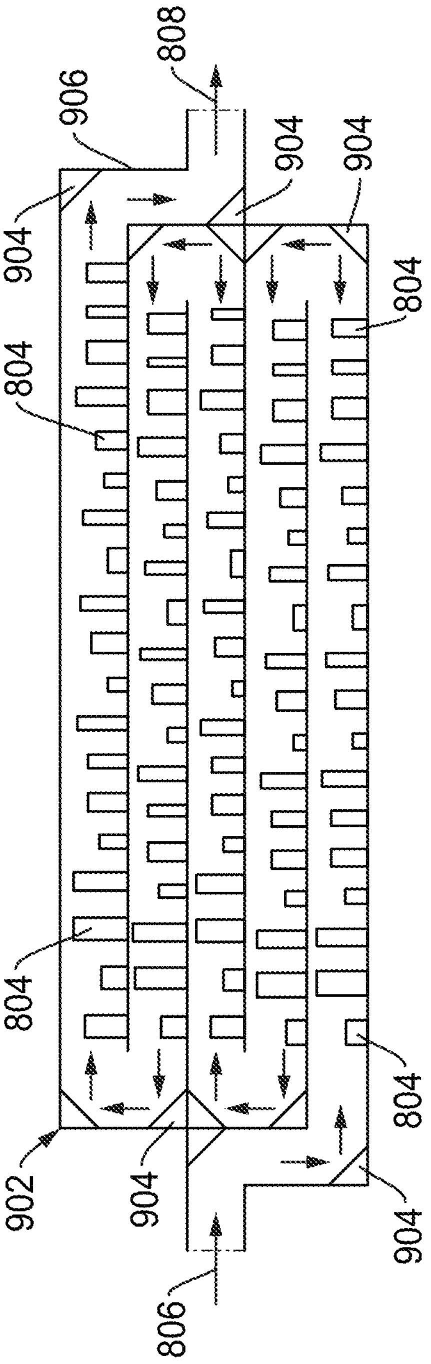
FIG. 7 illustrates a side view of a foldable metallic meta-lens array according to the disclosed embodiments.

FIG. 6 depicts a side view of a flat metallic meta-lens array 802 according to the disclosed embodiments. FIG. 7 depicts a side view of a folded metallic meta-lens array 902 according to the disclosed embodiments. Flat metallic meta-lens array 802 may function as flat meta-lens array 602 disclosed above except that it is comprised of metallic material. For example, flat metallic meta-lens array 802 may include a metallic casing 803 that houses metallic pins 804 for unit cells 108 of the beamformer. Input signal 806 is provided to flat metallic meta-lens array 802. Input signal 806 propagates through unit cells 108 having metallic pins 804. Output signal 808 may be provided to a transmitting element 404 of the beamformer.

Folded metallic meta-lens array 902 also received input signal 806 and propagates the signal through unit cells 108 with metallic pins 804 to generate output signal 808. Instead of being flat, however, folded metallic meta-lens array 902 has the unit cells folded on each other to reduce the width, or thickness, of the beamformer using a metallic meta-lens array. Folded metallic meta-lens array 902 may use reflectors 904 to move the signal from one layer to the next until output signal 808 is provided to the respective transmitting element of the beamformer. A layer 906 of folded metallic meta-lens array 902 may act as a parallel plate waveguide within the beamformer.

Figure 8:
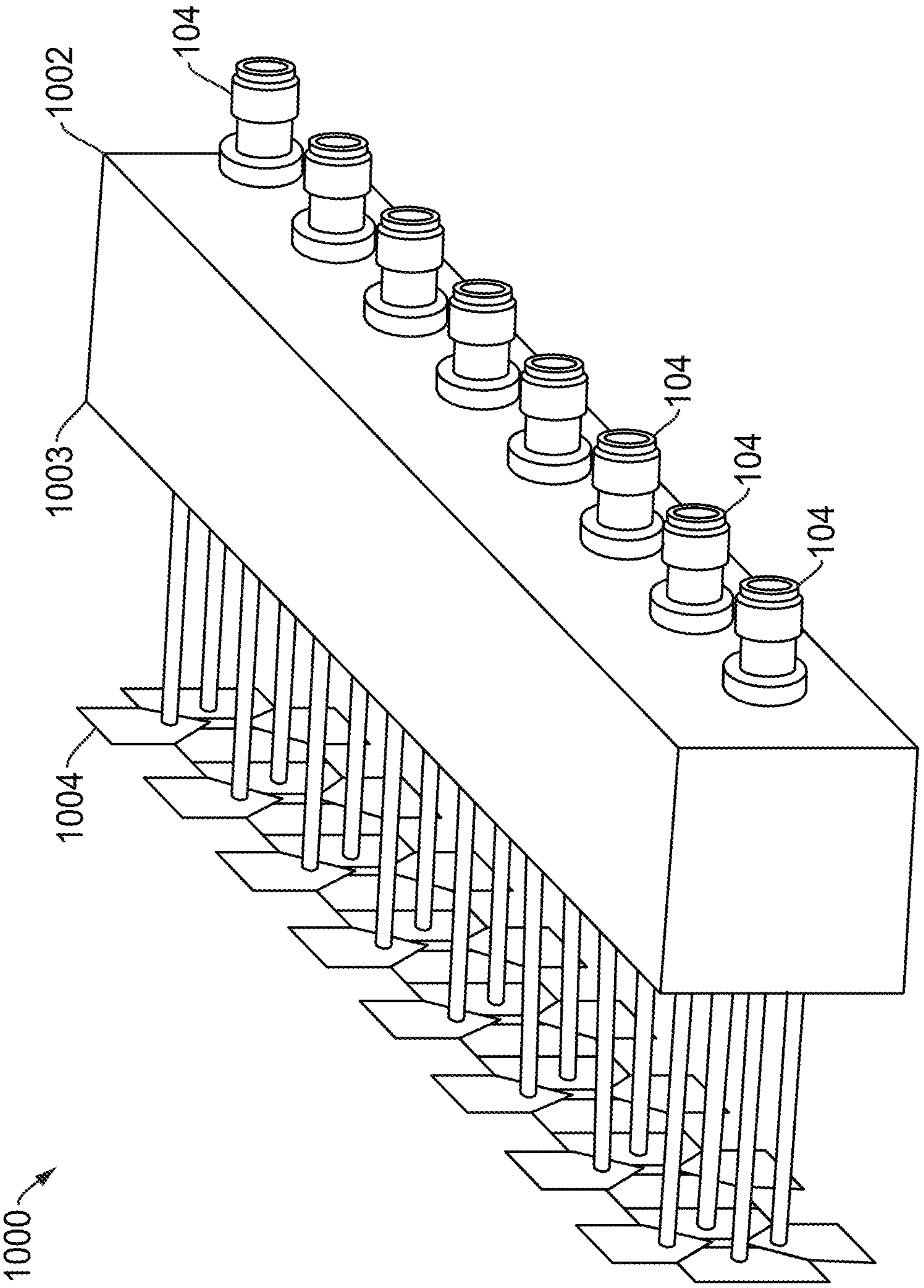
FIG. 8 illustrates a one-dimensional (1D) foldable multilayer beamformer antenna array according to the disclosed embodiments.

FIG. 8 depicts a folded multilayer beamformer antenna array 1000, hereinafter beamformer 1000, according to the disclosed embodiments. Beamformer 1000 may operate as the beamformers disclosed above. It includes feed ports 104 that input signals into folded layers 1002 that propagate the signal to radiator array 1004. Folded layers 1002 may correspond to the folded meta-lens arrays disclosed above. Folded layers 1002 may be enclosed in a housing 1003. As can be appreciated, beamformer 1000 may be stacked with other beamformers due to the decrease in size dimensions, such as thickness or the width/length of the array.

Figure 9:
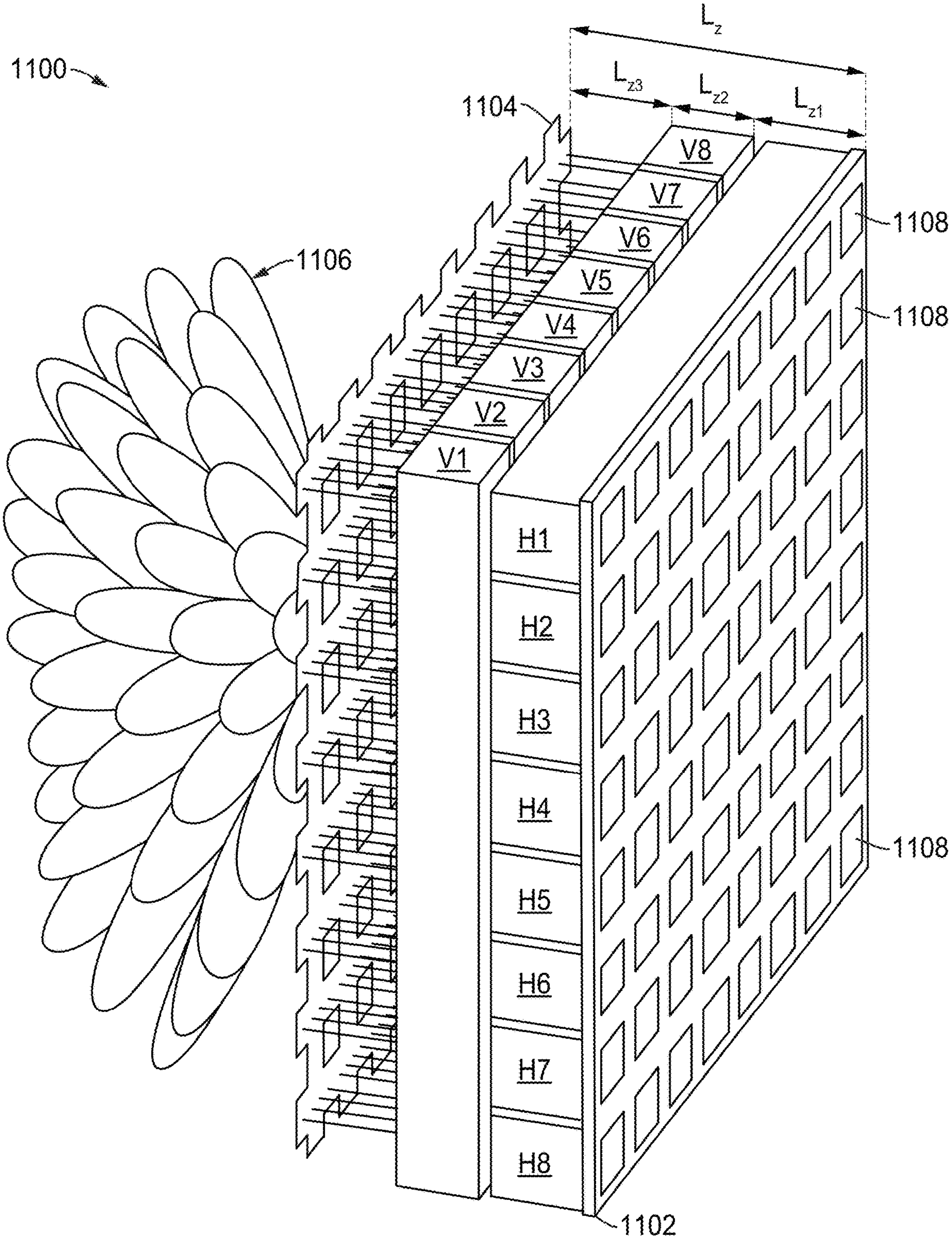
FIG. 9 illustrates a perspective view of a two-dimensional (2D) radio frequency beamformer according to the disclosed embodiments.

FIG. 9 depicts a perspective view of a two-dimensional (2D) radio frequency beamformer 1100 according to the disclosed embodiments. Beamformer 1100 includes a group of horizontal strips of unit cells stacked together to form a stack. These horizontal strips correspond to folded multilayer beamformer 1000 disclosed in FIG. 8. For example, horizontal strips H1, H2, H3, H4, H5, H6, H7, and H8 may be stacked together in a horizontal plane with regards to the base of beamformer 1100. Each horizontal strip may include meta-lens material folded to fit within a distance $L_{z1}$.

Beamformer 1100 also includes a group of vertical strips of unit cells positioned together in a vertical plane with regards to the base of beamformer 1100. The group includes vertical strips V1, V2, V3, V4, V5, V6, V7, and V8. Vertical strips V1-8 also corresponds to folded multilayer beamformer 1000 disclosed in FIG. 8. Each vertical strip may include meta-lens material folded to fit within a distance $L_{z2}$. The group of horizontal strips H1-8 and the group of vertical strips V1-8 placed together allows beamformer 1100 to perform 2D scanning. In some embodiments, distances $L_{z1}$ and $L_{z2}$ may be about half a wavelength such that the meta-lens arrays may be a wavelength in distance. This distance is reduced to implementing the 2D scanning using meta-lens arrays that are not folded.

Beamformer 1100 also includes interposer layer 1102. Interposer layer 1102 may include RF modules. Inputs 1108 may connect to feed ports to allow input signals into the meta-lens arrays for the respective strips of unit cells. Beamformer 1100 also includes radiator array 1104 that transmits signals 1106. Because beamformer 1100 implements 2D capability, it may generate signals 1106 into a variety of directions using the horizontal and vertical planes. Radiator array 1104 may have a distance $L_{z3}$ that is added to the other distances to provide an overall distance $L_z$ for beamformer 1100.

Thus, beamformer 1100 enables a 2D scanning array in a single PCB configuration. Beam steering in one dimension uses the feed ports and meta-lens circuits in the arrays. Beam steering in the second dimension uses may be done with traditional phase shifters or a similar phase meta-lens circuit stacked together. All these features may be provided with sizes related to the unit cells being folded together using connection points.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A radio frequency (RF) beamformer comprising:

a plurality of feed ports;

a plurality of strips of unit cells comprising meta-lens material connected to the plurality of feed ports, wherein each feed port of the plurality of feed ports emits a signal within a group of unit cells within the plurality of strips;

a radiator array configured to transmit at least one signal formed in the respective group of unit cells; and at least one folding connection point located between a first strip of unit cells and a second strip of unit cells of the plurality of strips of unit cells, wherein the first strip of unit cells and the second strip of unit cells collapse together at the at least one folding connection to form a stack of strips of unit cells, wherein the first strip of unit cells and the second strip of unit cells are configured to propagate the at least one signal while in the stack.

2. The RF beamformer of claim 1, wherein the at least one folding connection point includes a slot to allow the signal to propagate between the first strip of unit cells and the second strip of unit cells.

3. The RF beamformer of claim 1, wherein the at least one folding connection point includes a via to allow the signal to propagate between the first strip of unit cells and the second strip of unit cells.

4. The RF beamformer of claim 1, wherein the at least one folding connection point includes a reflector to allow the signal to propagate between the first strip of unit cells and the second strip of unit cells.

5. The RF beamformer of claim 1, wherein at least one unit cell of the plurality of strips of unit cells includes a radiating element.

6. The RF beamformer of claim 1, wherein at least one unit cell of the plurality of strips of unit cells includes a metallic pin.

7. The RF beamformer of claim 1, wherein the radiator array includes a plurality of transmitting elements.

8. The RF beamformer of claim 7, wherein the at least one signal includes a plurality of signals transmitted by the plurality of transmitting elements.

9. A two-dimensional radio frequency (RF) beamformer comprising:

a plurality of feed ports;

a group of horizontal strips of unit cells comprising meta-lens material connected to the plurality of feed ports, wherein each feed port of the plurality of feed ports inputs a signal within a first set of unit cells within one of the horizontal strips;

at least one horizontal folding connection point located between a first horizontal strip of unit cells and a second horizontal strip of unit cells of each of the group of horizontal strips of unit cells, wherein the first horizontal strip of unit cells and the second horizontal strip of unit cells collapse together using the at least one horizontal folding connection point to form a stack of unit cells along a horizontal axis;

a group of vertical strips of unit cells comprising the meta-lens material connected to the group of horizontal strips of unit cells, wherein the group of vertical strips further form the signal within a second set of unit cells within one of the vertical strips;

at least one vertical folding connection point located between a first vertical strip of unit cells and a second vertical strip of unit cells of each of the group of vertical strips of unit cells, wherein the first vertical strip of unit cells and the second vertical strip of unit cells collapse together using the at least one vertical folding connection point to form a stack of unit cells along a vertical axis; and a radiator array configured to transmit the signal formed by the first set of unit cells in a horizontal direction and formed by the second set of unit cells in a vertical direction.

10. The two-dimensional RF beamformer of claim 9, wherein the at least one horizontal folding connection point includes a slot to allow the signal to propagate between the first horizontal strip of unit cells and the second horizontal strip of unit cells.

11. The two-dimensional RF beamformer of claim 9, wherein the at least one vertical folding connection point includes a slot to allow the signal to propagate between the first vertical strip of unit cells and the second vertical strip of unit cells.

12. The two-dimensional RF beamformer of claim 9, wherein the at least one horizontal folding connection point includes a via to allow the signal to propagate between the first horizontal strip of unit cells and the second horizontal strip of unit cells.

13. The two-dimensional RF beamformer of claim 9, wherein the at least one vertical folding connection point includes a via to allow the signal to propagate between the first vertical strip of unit cells and the second vertical strip of unit cells.

14. The two-dimensional RF beamformer of claim 9, wherein the at least one horizontal folding connection point includes a reflector to allow the signal to propagate between the first horizontal strip of unit cells and the second horizontal strip of unit cells.

15. The two-dimensional RF beamformer of claim 9, wherein the at least one vertical folding connection point includes a reflector to allow the signal to propagate between the first vertical strip of unit cells and the second vertical strip of unit cells.

16. The two-dimensional RF beamformer of claim 9, wherein at least one unit cell of the horizontal strips of unit cells includes a radiating element.

17. The two-dimensional RF beamformer of claim 9, wherein at least one unit cell of the horizontal strips of unit cells includes a metallic pin.

18. The two-dimensional RF beamformer of claim 9, wherein at least one unit cell of the vertical strips of unit cells includes a radiating element.

19. The two-dimensional RF beamformer of claim 9, wherein at least one unit cell of the vertical strips of unit cells includes a metallic pin.

20. A method for propagating a signal through a radio frequency (RF) beamformer;

inputting the signal using a feed port of a plurality of feed ports connected to a meta-lens material array, wherein the meta-lens material array is stacked in a plurality of layers;

propagating the signal between the plurality of layers of the meta-lens material array using at least one folding connection point between connected layers of the plurality of layers;

applying a delay to the signal using at least one unit cell within each layer of the plurality of layers; and transmitting the signal based on the delay from a radiator array connected to the meta-lens material array.

* * * * *